(12) United States Patent
Wallmeier et al.

(10) Patent No.: US 11,597,357 B2
(45) Date of Patent: Mar. 7, 2023

(54) MOUNTING DEVICE FOR A SUPPORT DEVICE

(71) Applicant: SAF-HOLLAND GmbH, Bessenbach (DE)

(72) Inventors: Stefan Wallmeier, Goldbach (DE); Elmar Weber, Dulmen (DE)

(73) Assignee: SAF-HOLLAND GmbH, Bessenbach (DE)

( * ) Notice: Subject to any disclaimer, the term of this patent is extended or adjusted under 35 U.S.C. 154(b) by 346 days.

(21) Appl. No.: 16/650,443

(22) PCT Filed: Sep. 20, 2018

(86) PCT No.: PCT/EP2018/075419
§ 371 (c)(1),
(2) Date: Mar. 25, 2020

(87) PCT Pub. No.: WO2019/063397
PCT Pub. Date: Apr. 4, 2019

(65) Prior Publication Data
US 2020/0231130 A1    Jul. 23, 2020

(30) Foreign Application Priority Data
Sep. 26, 2017 (DE) ...................... 10 2017 122 316.9

(51) Int. Cl.
*B66F 5/00* (2006.01)
*B60S 9/04* (2006.01)
(Continued)

(52) U.S. Cl.
CPC . *B60S 9/04* (2013.01); *B60S 9/22* (2013.01); *B62D 53/06* (2013.01)

(58) Field of Classification Search
CPC ...... B60S 9/04; B60S 9/22; B60S 9/00; B60S 9/10; B60S 9/20; B60S 9/18
See application file for complete search history.

(56) References Cited

U.S. PATENT DOCUMENTS 3,776,569 A    12/1973    Carmel et al.
4,815,711 A *   3/1989    Bruno ..................... B66C 23/80
                                                                254/423

(Continued)

FOREIGN PATENT DOCUMENTS

CN    104563303 A    4/2015
DE    19616524 A1    11/1997
(Continued)

OTHER PUBLICATIONS

Vieweg GMBH; Roloff / Matek Maschinenelemente; Vieweg Technical Book; entire document.

(Continued)

*Primary Examiner* — Lee D Wilson
(74) *Attorney, Agent, or Firm* — Price Heneveld LLP (57) ABSTRACT

A mounting device for a support unit for commercial vehicles includes at least one supporting area, a first fixing area and a second fixing area, wherein the supporting area is configured to absorb the supporting forces in the supporting direction from the support unit or a support tube, wherein the first fixing area and the second fixing area are configured to fix the mounting device to a semi-trailer, wherein the first fixing area has at least one hole, wherein the second fixing area has at least one hole, and wherein the holes are configured to receive a fastener.

20 Claims, 5 Drawing Sheets

(51) Int. Cl.
*B60S 9/22* (2006.01)
*B62D 53/06* (2006.01)

(56) References Cited

U.S. PATENT DOCUMENTS

| | | | |
|---|---|---|---|
| 7,296,784 B2* | 11/2007 | Peter | B60S 9/12 |
| | | | 254/423 |
| 8,783,660 B1* | 7/2014 | Riddle | B60S 11/00 |
| | | | 254/424 |
| 10,899,320 B1* | 1/2021 | Speirs | B60S 9/08 |
| 2003/0006599 A1 | 1/2003 | Vandenberg et al. | |
| 2007/0012132 A1 | 1/2007 | McConnell | |
| 2009/0152855 A1 | 6/2009 | Muller et al. | |
| 2013/0187106 A1 | 7/2013 | Birkholz et al. | |
| 2015/0197220 A1* | 7/2015 | Lusty | B66F 3/02 |
| | | | 254/420 |
| 2016/0229244 A1* | 8/2016 | Drake | B60D 1/66 |
| 2016/0325717 A1 | 11/2016 | Wallmeier et al. | |
| 2018/0072279 A1 | 3/2018 | Lehman et al. | |
| 2019/0100256 A1* | 4/2019 | Cherry | B62D 43/002 |
| 2020/0231130 A1* | 7/2020 | Wallmeier | B60S 9/02 |

FOREIGN PATENT DOCUMENTS

| | | |
|---|---|---|
| DE | 10149926 A1 | 4/2003 |
| DE | 202004005981 U1 | 6/2004 |
| DE | 102004023749 A1 | 12/2005 |
| DE | 202009014883 U1 | 4/2010 |
| DE | 202012102865 U1 | 10/2012 |
| DE | 102012103698 A1 | 10/2013 |
| DE | 102013202076 A1 | 8/2014 |
| DE | 102014003412 B3 | 5/2015 |
| EP | 1595761 A1 | 11/2005 |
| GB | 746625 | 12/1937 |

OTHER PUBLICATIONS

European Patent Office; International Search Report; dated Nov. 14, 2018.

* cited by examiner

MOUNTING DEVICE FOR A SUPPORT DEVICE

BACKGROUND OF THE INVENTION

The present invention relates to a mounting device for supporting devices, especially those of commercial vehicles, as well as a mounting bracket for a mounting device.

Supporting devices or support jacks are known in the prior art. They serve for bracing and/or adjusting the height of trailers, semi-trailers or vehicles. The supporting devices known in the prior art usually comprise to this end an outer and an inner support tube, which can be telescopically fitted together. For the mounting on a trailer, semi-trailer, or vehicle, mounting devices are provided on the supporting devices, which are arranged with integral bonding on a corresponding surface of the trailer, especially in the case of heavily loaded supporting devices. This integrally bonded fixation, which is usually done by welding on, results in large labor expense and poor flexibility in the case of heavy loading.

The problem which the invention proposes to solve is to provide a support unit which can be securely mounted with only slight expense and which can be subjected to large forces, especially dynamic forces.

SUMMARY OF THE INVENTION

According to the invention, a mounting device for a support unit, in particular for commercial vehicles, comprises at least one supporting area, a first fixing area and a second fixing area, wherein the supporting area is designed to absorb the supporting forces, especially in the supporting direction, from the support unit or a support tube, wherein the first fixing area and the second fixing area are designed to fix the mounting device to a further element, especially a semi-trailer, wherein the first fixing area has at least one hole, wherein the second fixing area has at least one hole, and wherein the holes are designed to receive fixing means. The mounting device may, among other things, be part of a support unit, and in this embodiment the supporting area may be formed, inter alia, by the support tube itself or by a portion thereof, or by a surface on which the support tube can be fixed. The support tube in particular is the upper part of the support unit, which advantageously engages telescopically with the lower part of the support unit. The lower part of the support unit serves, among other things, for making contact with a bracing surface, such as the ground, in order to brace the further element. In an alternative embodiment, the mounting device may also be a separate component, which is arranged between the support unit and the further element. In this kind of mounting device, the supporting area is in particular the region of the mounting device on which the supporting device or the support tube is braced or arranged. Regardless of the configuration, the supporting area is therefore characterized in that it is adapted to absorb supporting forces from the support unit, the support tube, or other bracing elements that are acting in particular in the supporting direction, in order to brace the further element. Advisedly, the supporting area in order to accomplish its purpose can be arranged between the two fixing areas. In other words, the supporting area can thus separate the fixing areas from each other. The supporting direction is in particular that direction in which the support tube or the support unit primarily extends. In other words, the supporting direction may therefore in particular be the direction which is oriented opposite to the vector of gravity acceleration. The fixing areas of the mounting device serve for diverting the supporting forces absorbed by the supporting area from the mounting device directly or indirectly into the further element. The diverting may thus occur indirectly, for example by a mounting bracket, or directly by a direct contact of one or both fixing areas with a further element. The further element may be formed, for example, by a trailer, a semi-trailer, or their vehicle frames, or by a mounting bracket. The at least one hole in the first fixing area and the at least one hole in the second fixing area are round, especially at least for a portion, and serve for receiving fixing means such as screws or bolts, so that the mounting device can be secured directly or indirectly on a further element. In this way, the support unit is secured, especially in reversible (nondestructive) manner, detachably on the further element, so that the support unit can be mounted easily and cost effectively. Thanks to the flexibility of the connection, the mounting device is able to be subjected even to high dynamic forces. The holes pass through the mounting areas preferably entirely and are round at least for a portion, so that the holes can be oblong holes, among others. Preferably, however, the holes are circular round, so that they can be produced in an especially cost effective manner.

Advisedly, the first fixing area has a plurality of holes, forming a first hole series, and wherein the second fixing area has a plurality of holes, forming a second hole series. By a plurality is meant in particular that more than two, especially four, five, six, seven or eight holes form the hole series. By "hole series" is meant, among other things, that the midpoints of the holes extend in particular along a straight line. Thanks to the arrangement of the holes in the fixing areas along a line or a straight line, an especially cost effective fabrication of the mounting device can be achieved. Alternatively, a "hole series" may also be formed by arranging holes along a circular path or a portion thereof. The benefit of this configuration is that an especially large region is available for the transmitting of forces in this hole arrangement. In order to ensure an especially favorable fabrication, it is preferable for the holes to be arranged equidistant along the hole series. Alternatively, the spacing may also not be equidistant at least between certain holes of the hole series. In this way, large mounting forces can be transmitted, especially in particularly heavily loaded areas. It is especially advisable for the holes in the end regions of the hole series or the circular hole segment to be less further apart than in the "middle" of the hole series. Thanks to this kind of hole arrangements in the fixing areas, a gaping of the parting line between the mounting device and the further element or mounting bracket can be effectively prevented, since the stresses in the "middle" are usually less.

Advantageously, at least two holes of the first hole series have different geometries, especially diameters, and/or wherein at least two holes of the second hole series have different geometries, especially diameters. The geometries of the holes are characterized in particular by the contours formed by the holes in the fixing area. Advisedly, the holes are round at least for a portion, especially circular round. In other words, this means that the holes can advisedly be circular round holes or oblong holes. The diameter in the case of oblong holes is in particular the extension of the oblong hole perpendicular to its major axis of extension. In other words, the diameter of an oblong hole may be the distance between the two flanks oriented parallel to each other. Thanks to the use of different geometries, especially diameters, of the holes in the fixing areas, it is possible to adapt the fixing means being used—in heavily stressed and possibly low stressed regions of the fixing areas—to the given stresses and thus save on costs.

Preferably the hole(s) of the first fixing area and/or the hole(s) of the second fixing area have a diameter which lies in a ratio to a wall thickness of the respective fixing area of 2.33 to 4.75. In this way, an especially slight notch effect can be achieved. The wall thickness of the fixing area is in particular its material thickness in the direction in which the holes also extend. Preferably the ratio lies in a range of 2.66 to 4.5. It has been found that an especially good compromise can be achieved in this range between a homogeneous distribution of the surface pressure in the parting line and a low weight for the mounting device.

Advantageously the first hole series is slanted and/or the second hole series is slanted. Slanted means here, among other things, that the hole series make an angle not equal to 0° or 180° with the supporting direction. Especially preferably, the slanted hole series also do(es) not make an angle of 90° with the supporting direction. In other words, the first and/or the second hole series are therefore inclined relative to the supporting direction. This makes it possible for an especially small design space to be occupied by the mounting device, especially in the supporting direction, while it can still absorb large and especially dynamic forces. In order to achieve low manufacturing costs, it is advantageous for both hole series to run parallel to each other. Alternatively, the hole series may also preferably have an angle not equal to 0° or 180° with each other. In other words, this may mean that the hole series form a kind of V-shape with each other, the V being able to point upward or downward in the supporting direction. A V-shape may also occur, in particular, when the two flanks of the V intersect in an imaginary prolongation. Upward or downward here means respectively the positive direction, especially opposite the direction of gravity, or the negative direction of the supporting direction. The V-shaped arrangement of the hole series with each other has the advantage in particular that large torques can be diverted in an especially stable manner from the mounting device to the further element, which may be important especially in the case of uneven ground surfaces. It may be advisable for the angle bisector—of the first and second hole series in V-arrangement—to make an angle with the supporting direction that is not equal to 0° or 180°. In this way, the mounting device, especially its fixing areas, can be optimally adapted to the available design space.

Advantageously the first hole series forms a first angle with the second hole series lying in the range of 87° to 5°. Thanks to this angularity, the effectively available mounting length formed by the two hole series is enlarged, so that especially large and dynamic forces can be safely channeled from the mounting device to the further element—across the fixing areas. Preferably the first angle lies in a range of 45° to 10°, in order to be able to also absorb large torques. Especially preferably, the first angle lies between 26° and 19°, since it has been shown that an especially homogeneous surface pressure exists at the mounting parting line in this range, so that local plastic deformations can be avoided.

Preferably the spacing in the supporting direction between adjacent holes of the first hole series and/or the spacing in the supporting direction between adjacent holes of the second hole series stands in a ratio to the wall thickness of the respective fixing area in a range of 7.5 to 17.5, preferably 8.3 to 16.3 and especially preferably 10 to 15. In this way, an especially low design space requirement for the mounting device can be assured. The spacings between the holes pertain to that of two directly adjacent holes. Preferably, the spacings pertain not only to two adjacent holes, but also to the vast majority of adjacent holes of the hole series and especially preferably to all adjacent holes of the respective hole series. By adjacent is also meant, in particular, in direct proximity. In order to achieve an especially steady mounting device, it is advisable for the ratio of the spacings in the supporting direction of adjacent holes to the wall thickness of the respective fixing area to lie in a range of 8.3 to 16.3, since it has been shown that the fixing areas in this configuration have especially little tendency to form cracks. In order to achieve an especially homogeneous surface pressure in the parting line, it is especially preferable for the ratio of the spacings in the supporting direction of adjacent holes to the wall thickness of the respective fixing area to lie in a range of 10 to 15.

Advisedly the spacing in a longitudinal direction between adjacent holes of the first hole series and/or the spacing in a longitudinal direction between adjacent holes of the second hole series stands in a ratio to the wall thickness of the respective fixing area in a range of 0.5 to 5. With this kind of configuration of the fixing areas relative to the holes of the respective fixing area it is possible to achieve an especially good bracing effect even for forces acting transversely to the bracing direction. The longitudinal direction in particular stands perpendicular to the supporting direction and if possible also perpendicular to the direction in which the holes extend. In other words, the longitudinal direction may therefore be the direction in which the length of the further element is determined, on which the mounting device can be secured. In order to achieve an especially steady mounting device, especially due to slight notch effect, preferably the ratio lies between 0.8 and 3.8. Especially preferably, the ratio lies between 1.1 and 2.5, since it has been shown that an especially homogeneous surface pressure exists on the fixing area in such a configuration. The indicated spacings between adjacent holes pertain here respectively to two adjacent holes of the first and/or second hole series. Preferably the mutual spacings pertain not only to two holes, but also to the overwhelming majority of adjacent holes of the respective hole series and especially preferably to all adjacent holes of the respective hole series.

Preferably the mean spacing between the first hole series and the second hole series lies in a ratio to an averaged wall thickness of the fixing areas in a range of 29 to 62.5, preferably 30 to 51 and especially preferably 31.5 to 48. In this way, an especially good stability can be achieved thanks to slight notch effects—due to the hole series. The mean spacing of the first hole series from the second hole series is determined in particular by the spacing of the midpoint of the first hole series from the midpoint of the second hole series. The midpoint of the hole series here is the geometrical midpoint of the connection lines of the most distant holes of the hole series relative to each other. The averaged wall thickness of the fixing areas is the mean value of the wall thickness from the first fixing area and the wall thickness of the second fixing area. If the fixing areas have variable wall thicknesses, the wall thickness of the respective fixing area is determined by the surface-averaged wall thickness. Preferably the ratio of the mean spacing—of the first hole series from the second hole series—to the averaged wall thickness of the fixing areas lies in a range of 30 to 51, because it has been shown that with such a ratio an especially homogeneous surface pressure is present in the parting line. In order to achieve a low tendency to form cracks, it is especially preferable for the ratio to lie in a range of 31.5 to 48.

Preferably the normal of a distally bordering surface of the first fixing area, especially in the longitudinal direction, makes a second angle of 55° to 87° with the supporting direction and/or wherein the normal of a second distally bordering surface of the second fixing area, especially in the longitudinal direction, makes a third angle of 55° to 87° with the supporting direction. The distally bordering surfaces are in particular those surfaces forming the distal end of the first or the second fixing area, especially in the longitudinal direction. Preferably the two distally bordering surfaces are oriented away from each other and can thus form in particular the opposite borders of the mounting device, especially in the longitudinal direction. The normal of the distally bordering surfaces is the outwardly directed averaged normal of the distally bordering surfaces. Preferably this normal points for the most part in the longitudinal direction. Thanks to the angularity of the first distally bordering surface and/or the second distally bordering surface to the supporting direction, it is possible to significantly simplify the installation of the mounting device, since the external angled appearance of the mounting device can be used for its centering. Preferably the second angle and/or the third angle lies in a range of 65° to 85°. In this way, an especially good bracing action of the mounting device can be achieved when large torques are acting on the supporting area or areas. Especially preferably, the second angle and/or the third angle lies in a range of 75° to 80°. This configuration of the mounting device has the advantage that an especially small design space requirement can be achieved for the mounting device. It may be especially advisable for the first and/or the second hole series to run parallel to the first and/or second distally bordering surface. The advantage of this configuration is that the distally bordering surfaces can be used as end stop surfaces during the fabrication process, so that an especially cost-effective fabrication and thus mounting device will be the result.

Preferably the mounting device comprises a bracing area, which extends in a transverse direction or a hole direction away from at least one of the fixing areas or the supporting area and comprises a bearing surface which is adapted to transmit a force, by form fit, from the mounting device to the further element, especially in the supporting direction. The transverse direction advisedly stands perpendicular to the supporting direction and the longitudinal direction. In particular, the transverse direction may be the direction corresponding to the width direction of the further element. In other words, the transverse direction may be the direction in which the width of the further element, such as a trailer or semi-trailer, is determined. The hole direction is the direction in which the holes of the mounting device extend, especially the holes of the first and/or the second fixing area. Preferably the hole direction points substantially in the transverse direction. By a substantially transverse direction is meant that slight deviations up to an angle of 10°, preferably 5°, from the transverse direction are regarded as being substantially in the transverse direction. The form-fitted transmission of the forces between the bracing area of the mounting device and the further element or a mounting bracket may be accomplished, for example, by an undercut with the further element or the mounting bracket. This may be done in particular by the bracing area engaging beneath the further element or the mounting bracket. By this engaging underneath, it is possible to be able to avoid a weakening of the further element or the mounting bracket. The bearing surface of the bracing area is the surface of the bracing area which makes contact with the further element or with the mounting bracket and thereby transmits a force by form fitting from the mounting device to the further element or the mounting bracket. Preferably the bearing surface has an averaged outwardly directed normal, pointing substantially in the supporting direction. By "substantially in the supporting direction" is meant in this context that the averaged normal of the surface may have an angle with the supporting direction of at most 10°. Thanks to this arrangement or orientation of the bearing surface, a resulting transverse force can be avoided in a simple yet effective manner. Preferably the bracing area is formed as a single piece with the mounting device. This can be accomplished in an especially cost-effective manner in particular by a welding of the bracing area onto the mounting device. The single-piece construction can ensure that especially large, particularly dynamic forces can be diverted from the mounting device into the further element.

Furthermore, according to the invention a mounting bracket comprises a fixing area and a mounting area, wherein the mounting area is adapted to make contact with a mounting device as described above, and wherein the fixing area is adapted to being mounted on a fixing surface of a further element. The mounting bracket may be a separate component, or also be formed as a single piece with the further element, especially by form-fitted joining. In general, the mounting bracket is adapted to absorb forces from a mounting device and to transmit them securely onto a fixing surface of the further element. The fixing area of the mounting bracket thus serves in particular for making contact with a fixing surface of the further element, especially direct contact, so that a secure force transmission can occur. This force transmission may occur both by a reversible connection, such as a screw connection, or by an integral bonding connection, especially welding. The mounting area of the mounting bracket, on the other hand, serves for absorbing forces from a mounting device. Advisedly, the mounting area has openings for this purpose, which can be adapted to receiving mounting means, such as screws. These openings may be fashioned either as a through hole or a blind hole.

Moreover, according to the invention a mounting bracket comprises a fixing area, a mounting area, and an undercut section, wherein the mounting area is adapted to make contact with a mounting device, wherein the fixing area is adapted to being mounted on a fixing surface of a further element, and wherein the undercut section is adapted to engage by form fit with the mounting device so that a displacement of the mounting device relative to the mounting bracket is prevented at least in one direction, especially in the supporting direction. The undercut section preferably protrudes in a transverse direction, which is oriented in particular parallel to the normal of the fixing surface. The undercut section may preferably be part of the mounting area or also alternatively it may be a separate element of the mounting bracket. Advisedly the undercut section is located in the upper or lower third of the mounting area of the mounting bracket, especially in regard to the supporting direction. This ensures that the undercut section can also additionally transmit torques, so that an especially secure bracing action of the mounting bracket can be achieved. Advantageously, the undercut section is configured such that it prevents a displacement in the supporting direction and/or in the transverse direction by form fitting—at least, respectively in a positive and/or negative direction. This can be accomplished in particular by the undercut section forming an undercut at least for a portion, in particular with one of the fixing areas of the mounting device. Alternatively or additionally, the undercut may also be formed with part of the supporting area of the mounting bracket.

BRIEF DESCRIPTION OF THE DRAWINGS

Further benefits and features of the present invention will emerge from the following specification with regard to the enclosed figures. Individual features disclosed in the embodiments depicted may also be used in other embodiments and/or be combined, as long as this is not explicitly ruled out. There are shown.

DETAILED DESCRIPTION OF THE PREFERRED EMBODIMENTS

Figure 1:
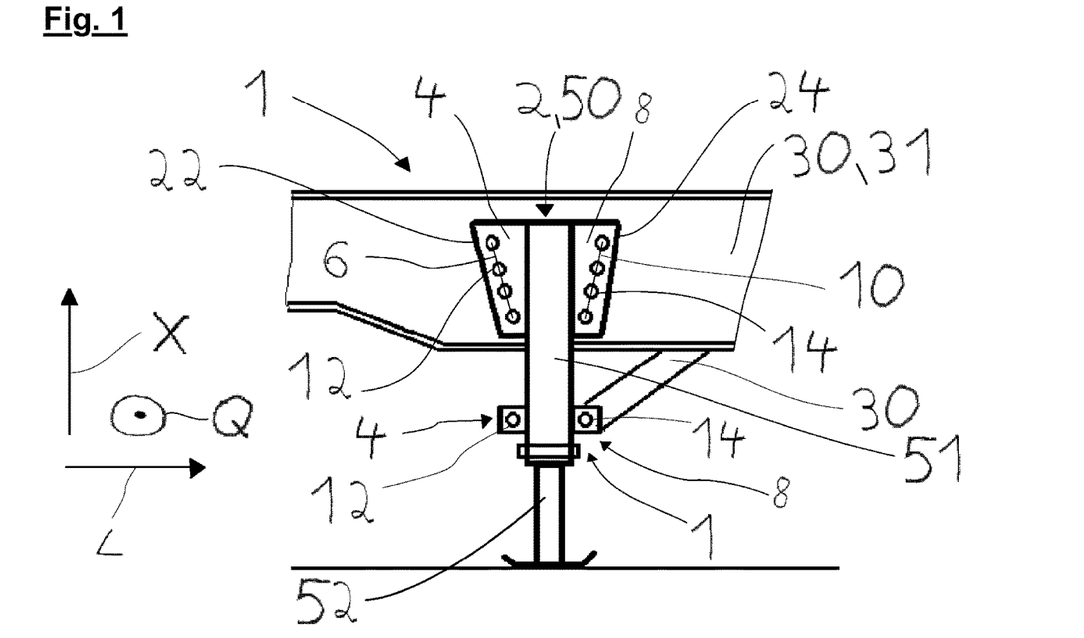
FIG. 1 is a partial side elevational view of a supporting device fixed to a further element.

FIG. 1 shows in the upper region of the supporting device 50 a primary mounting device 1, comprising a first fixing area 4, a second fixing area 8 and a supporting area 2. The supporting area 2 serves to absorb forces, especially in the supporting direction X, from the support tube 51 of the supporting device 50. The supporting device 50 comprises, among other things, the support tube 51 and a lower part of the support unit 52, which is adapted to make contact with the ground. In the arrangement shown in FIG. 1, the supporting device 50 is secured by both a primary mounting device 1 (top) and a secondary mounting device 1 (bottom) on the further element 30. The primary mounting device 1 is spaced apart from the secondary mounting device 1 in the positive supporting direction X. The primary mounting device 1 shown in FIG. 1 has four holes 12 in its first fixing area 4, forming a first hole series 6 with each other. The distally bordering surface of the first fixing area 22 borders the first fixing area 4 in the negative longitudinal direction L. The second fixing area 8 of the primary mounting device 1 is built in mirror symmetry to the first fixing area 4 in regard to a plane subtended by the transverse direction Q and the supporting direction X. The primary mounting device 1 leads the supporting forces, acting primarily in the supporting direction X, out onto the fixing surface 31 of the further element 30. The secondary mounting device 1 likewise comprises a first fixing area with a hole 12 and a second fixing area 8 with a hole 14.

Figure 2:
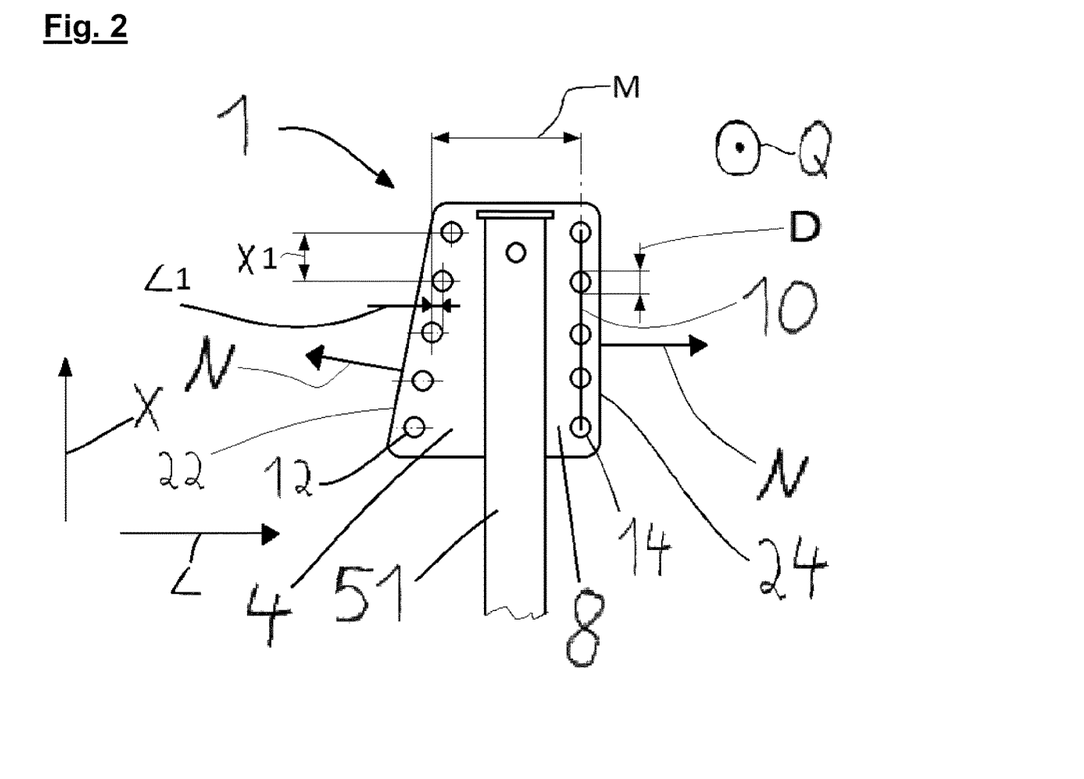
FIG. 2 is a side elevational view of one embodiment of a mounting device.

FIG. 2 shows a further embodiment of a mounting device 1. In the embodiment of the mounting device 1 shown, the mean spacing M of the first hole series 6, which is not specifically indicated in FIG. 2 for sake of clarity, is represented with a second hole series 10 of the second fixing area 4. The holes 14 of the second fixing area 8 have a diameter D. The holes 12 of the first fixing area 4 have a spacing X1 in the supporting direction X and a spacing L1 in the longitudinal direction L from each other. The first hole series of the first fixing area 4, just like the second hole series of the second fixing area 8, is arranged respectively parallel to the distally bordering surface of the fixing areas (22, 24). In FIG. 2, both the normal N of the distally bordering surface of the first fixing area 22 and also the normal N of the distally bordering surface of the second fixing area 24 can be seen. The transverse direction Q here is oriented parallel to the hole direction of both the holes 12 and the holes 14.

Figure 3:
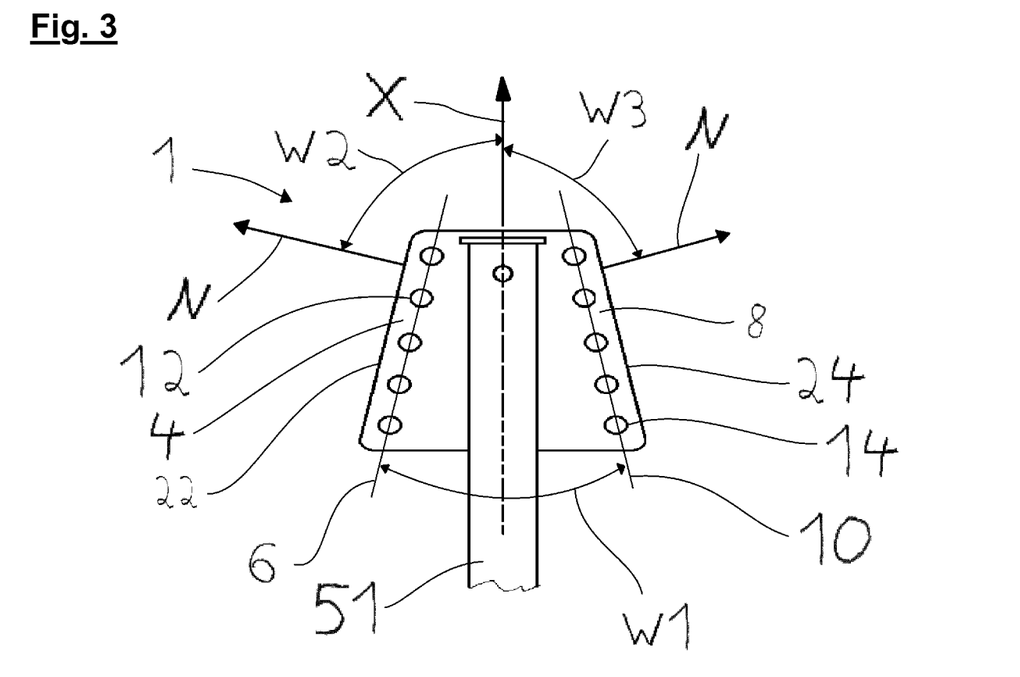
FIG. 3 is a side elevational view of another embodiment of a mounting device.

FIG. 3 shows a further embodiment of a mounting device 1, having a first fixing area 4 and a second fixing area 8. The first fixing area 4 comprises a first hole series 6, which is formed by the holes 12, and the second fixing area 8 comprises a second hole series 10, which is formed by the holes 14. The first hole series 6 and the second hole series 10 are both slanted. In other words, this means that the two hole series respectively make an angle not equal to 0° or 180° with the supporting direction X. In addition, the two hole series 6 and 10 also run relative to each other so that they make a first angle W1 with each other, the angle bisector of the first angle W1 being oriented parallel to the supporting direction X. The distally bordering surface of the first fixing area 22 has an outwardly pointing normal N, which makes a second angle W2 with the supporting direction X. Likewise, the distally bordering surface of the second fixing area 24 has a normal N making a third angle W3 with the supporting direction X. In the embodiment shown in FIG. 3, the angle W2 and the angle W3 are the same size. Alternatively, however, the angles can preferably also be of different size. In the embodiment shown in FIG. 3, the first hole series 6 and the second hole series 10 have a V-shape relative to each other, the V in the depicted embodiment being open toward the bottom—looking in the supporting direction X. In the embodiment shown in FIG. 3, the distally bordering surface of the first fixing area 22 and the distally bordering surface of the second fixing area 24 also form a V-shape open toward the bottom in the supporting direction. The supporting area 2 cannot be seen in FIG. 3, since it is covered by the support tube 51.

Figure 4:
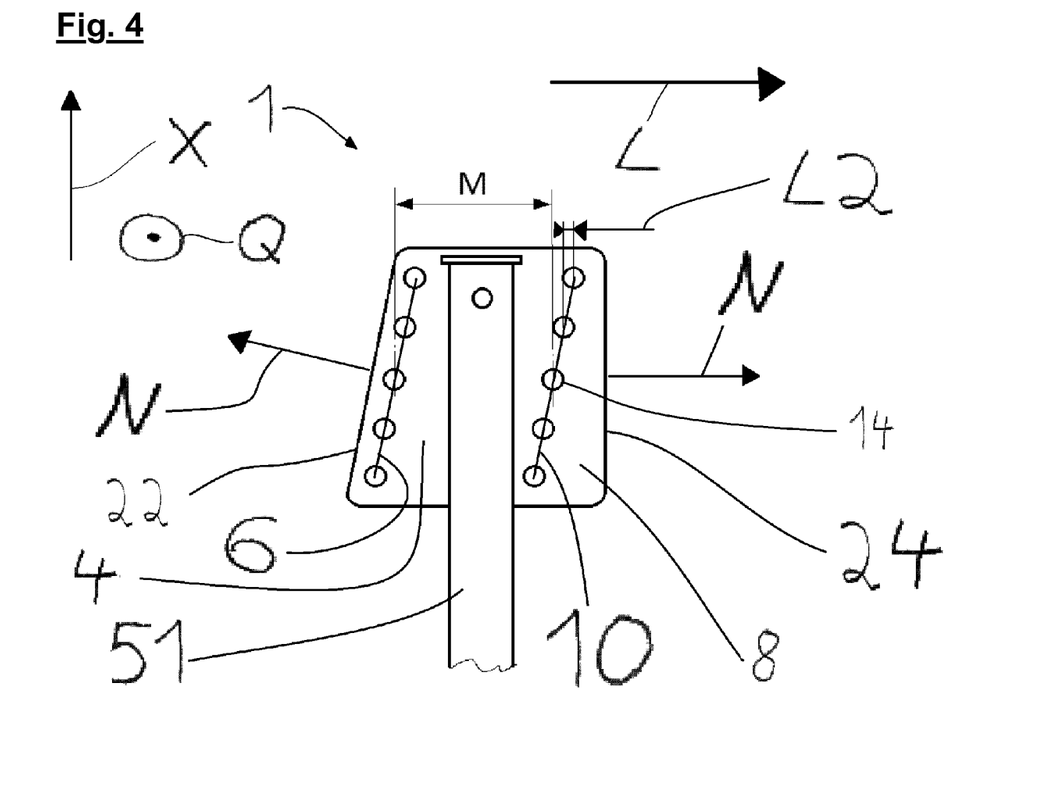
FIG. 4 is a side elevational view of another preferred embodiment of a mounting device.

The mounting device 1 represented in FIG. 4 differs as compared to the variant shown in FIG. 3 among other things by the fact that the second hole series 10 of the second fixing area 8 is arranged such that this hole series runs parallel to the first hole series 6. The holes 14 of the second hole series 10 have a spacing L2 from each other in the longitudinal direction L. In the embodiment shown, the normal N of the distally bordering surface of the second fixing area 24 points in the longitudinal direction L. The distally bordering surface of the first fixing area 22, on the other hand, is configured such that this surface is oriented parallel to the first hole series 6 and makes an angle with the supporting direction X which is not equal to 90°.

Figure 5:
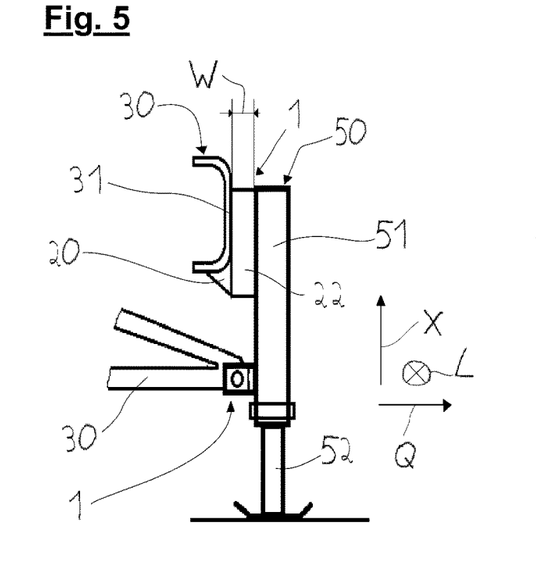
FIG. 5 is a partial elevational end view of an embodiment of a mounting device having a bracing area.

FIG. 5 shows a side view of a support unit 50, which is fixed by means of a primary mounting device 1 and a secondary mounting device 1 on a further element 30. The primary mounting device 1, which is spaced apart from the secondary mounting device 1 in the positive supporting direction X, has a bracing area 20, which engages in form fitting beneath the further element 30. In FIG. 5, moreover, the wall thickness W of the two fixing areas of the primary mounting device 1 can also be seen. The supporting area advantageously has the same wall thickness as the wall thickness W of the fixing areas.

Figure 6:
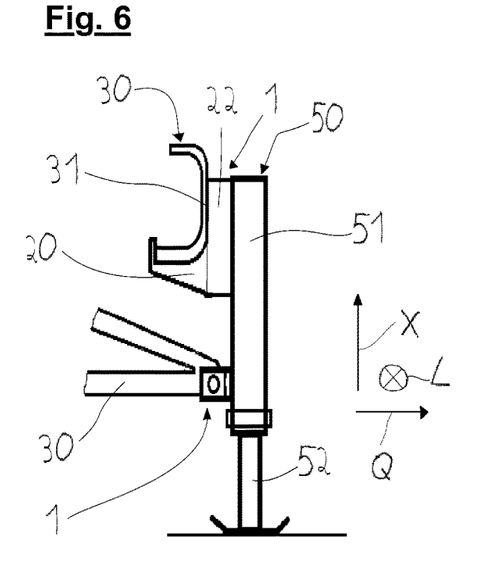
FIG. 6 is a partial elevational end view of another embodiment of a mounting device having a bracing area.

In FIG. 6, a side view or rear view of another embodiment of a support unit 50 can be seen, having a primary and a secondary mounting device 1. The bracing area 20 of the embodiment of the mounting device 1 shown in FIG. 6 is configured such that it not only prevents a form-fitted displacement in the supporting direction X, but also is able to prevent a displacement in the positive and negative transverse direction Q. This is accomplished by the bracing area 20, among other things, by the fact that it not only engages beneath the further element 30, but also engages additionally or at the same time behind it with form fitting.

Figure 7:
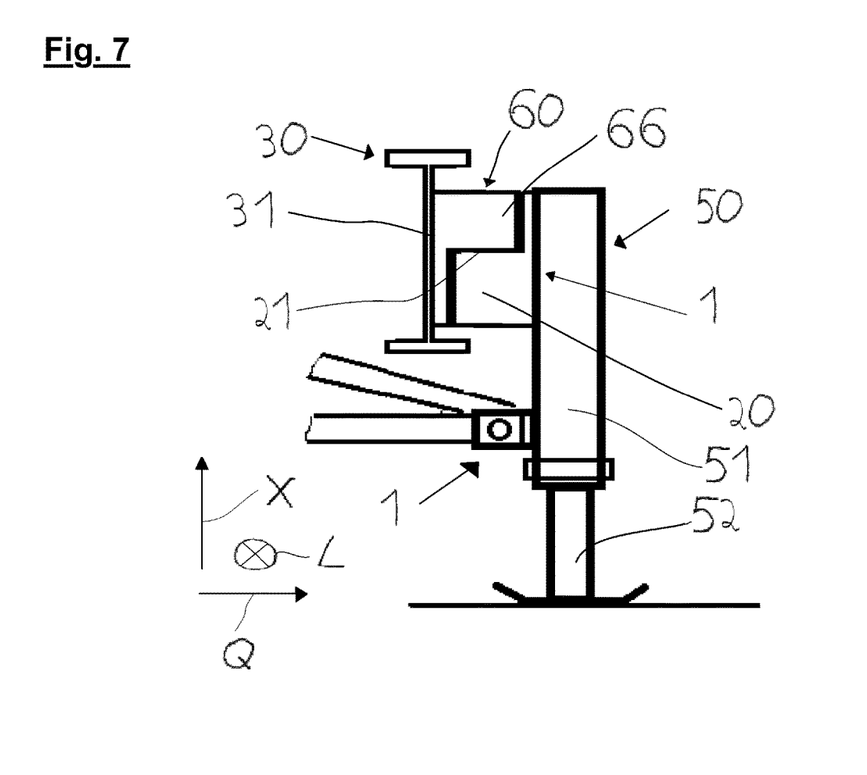
FIG. 7 is a partial elevational end view of a mounting device in combination with a mounting bracket.

FIG. 7 shows a support unit 50 comprising a support tube 51 and a lower part of the support unit 52, which are fitted together telescopically. The support unit 50 is braced with form fitting by a primary mounting device 1, having a bracing area 20, on a mounting bracket 60 in the supporting direction X. The bracing area 20 of the mounting device 1 in the embodiment shown is formed by a protrusion in the transverse direction Q, which is situated in the supporting direction X beneath the undercut section 66 of the mounting bracket 60 and engages with it by form fitting via the bearing surface 21. The undercut section 66 of the mounting bracket 60 likewise extends in the transverse direction Q. The mounting bracket 60 is secured on a fixing surface 31 of the further element 30. For further bracing, the embodiment of the support unit 50 shown in FIG. 7 also additionally has a secondary mounting device 1, which is provided in the lower region of the support unit 50.

Figure 8:
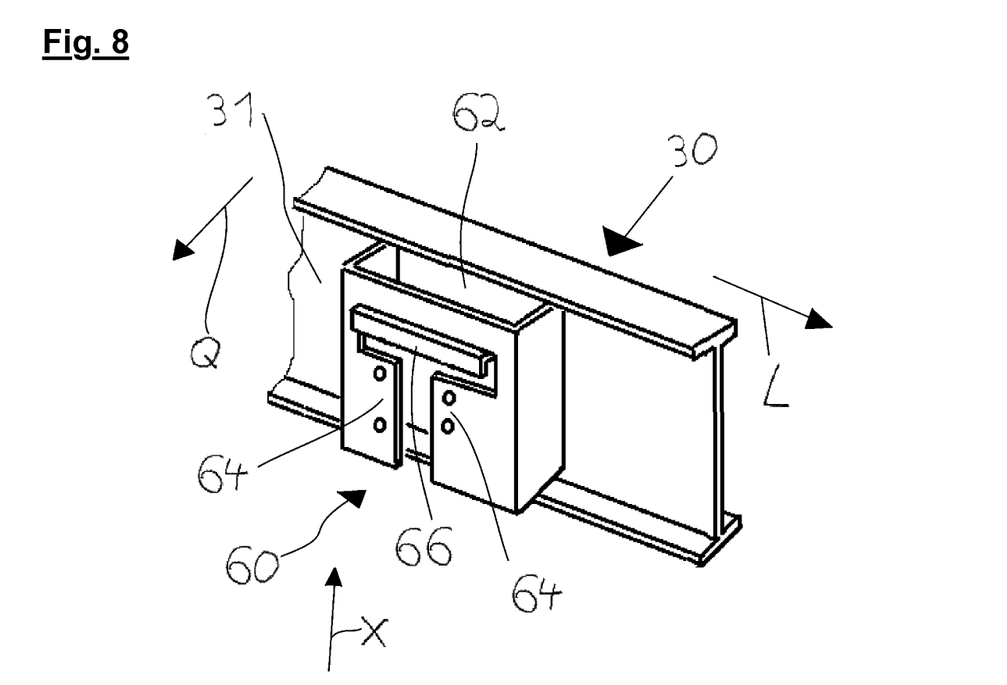
FIG. 8 is a partial perspective view of a mounting bracket according to the invention.

FIG. 8 shows a mounting bracket 60, having two mounting areas 64. For the securing of a mounting device, each of the mounting areas 64 has two openings. In addition, the mounting bracket 60 has an undercut section 66 above the mounting sections 64 in the supporting direction X, which is adapted such that it can be brought to engage in form fitting with a mounting device. The undercut section 66 by form fitting prevents a potential displacement of the mounting device in the transverse direction Q and in the supporting direction X. For its securing on a fixing surface 31 of the further element 30, the mounting bracket 60 has a fixing area 62, which is arranged distally opposite from the mounting section 64 in the transverse direction Q. In the embodiment shown in FIG. 8, the fixing area 62 is welded firmly to the further element 30. Alternatively, however, the mounting bracket can also preferably be secured to the further element 30 or to the fixing surface 31 of the further element 30 reversibly—e.g., by a screw connection. In addition, the mounting bracket 60 is also braced on the further element 30 by engaging by form fitting beneath the upper flange of the beam of the further element 30.

Figure 9:
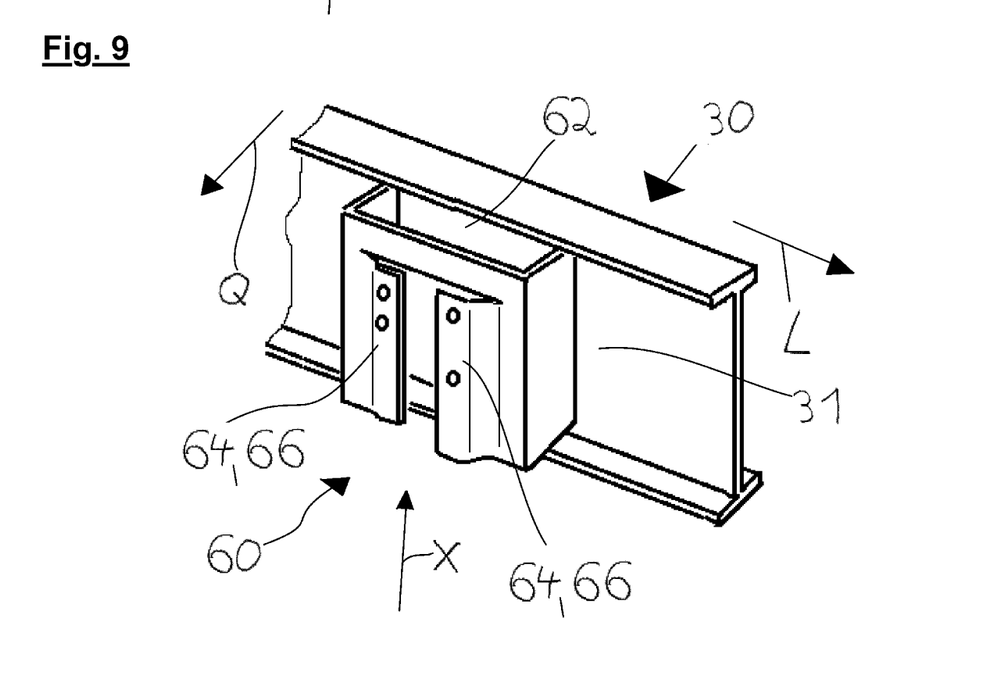
FIG. 9 is a partial perspective view of another embodiment of a mounting bracket.

The embodiment of a mounting bracket 60 shown in FIG. 9 differs from the embodiment shown in FIG. 8, among other things, by the fact that the undercut is configured such that the undercut sections 66 are formed in the mounting areas 64. To accomplish this, the two mounting areas 64 and thus also the undercut sections 66 protrude in the transverse direction Q. The normal of the fixing surface 31 of the further element 30 is oriented parallel to the transverse direction Q.

Figure 10:
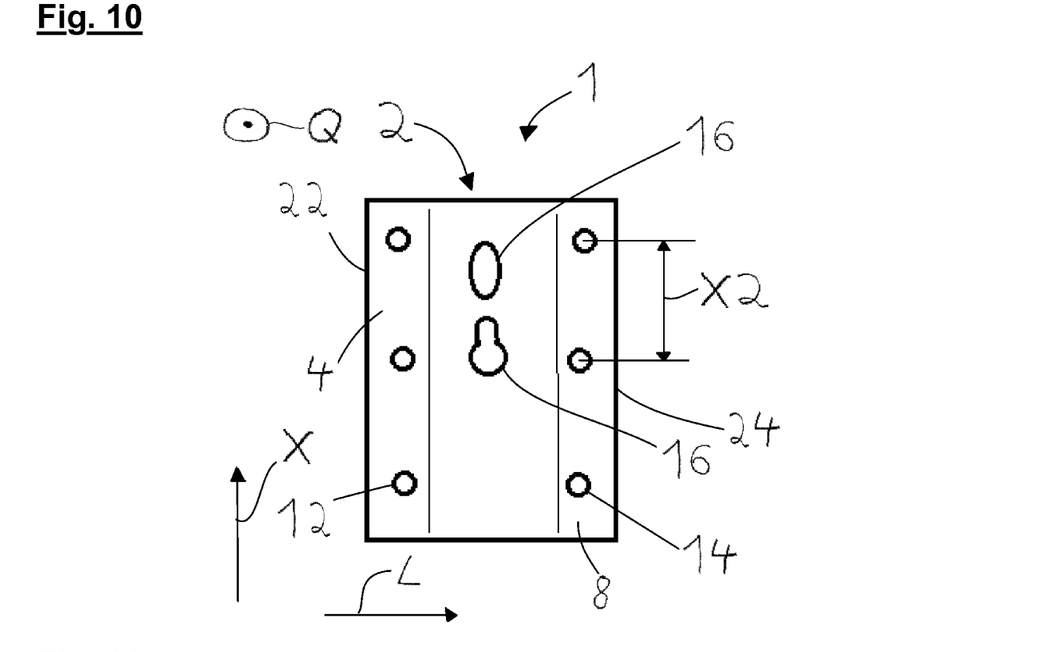
FIG. 10 is a side elevational view of an alternative embodiment of a mounting device.

The embodiment of the mounting device 1 shown in FIG. 10 has three holes (12, 14) apiece in the first and second fixing area (4, 8), these holes (12, 14) extending in a hole direction oriented parallel to the transverse direction Q. The holes 14 of the second fixing area 8 have a spacing X2 from each other in the supporting direction X. Openings 16 are provided in the supporting area 2 of the mounting bracket 60. These openings 16 are adapted for the form-fitted and force-locking securement of a support unit 50 (not shown). The form-fitted securement occurs, in particular, through the keyhole-shaped opening 16 of the fixing area 2. Wherein mounting means, not shown, may be led through the larger part of the keyhole-shaped opening 16, but not through the upper narrower region of the opening 16, so that a form-fitted securing of the support unit 50 in the transverse Q, longitudinal L and/or supporting direction X on the mounting device 1 can occur in this way.

Figure 11:
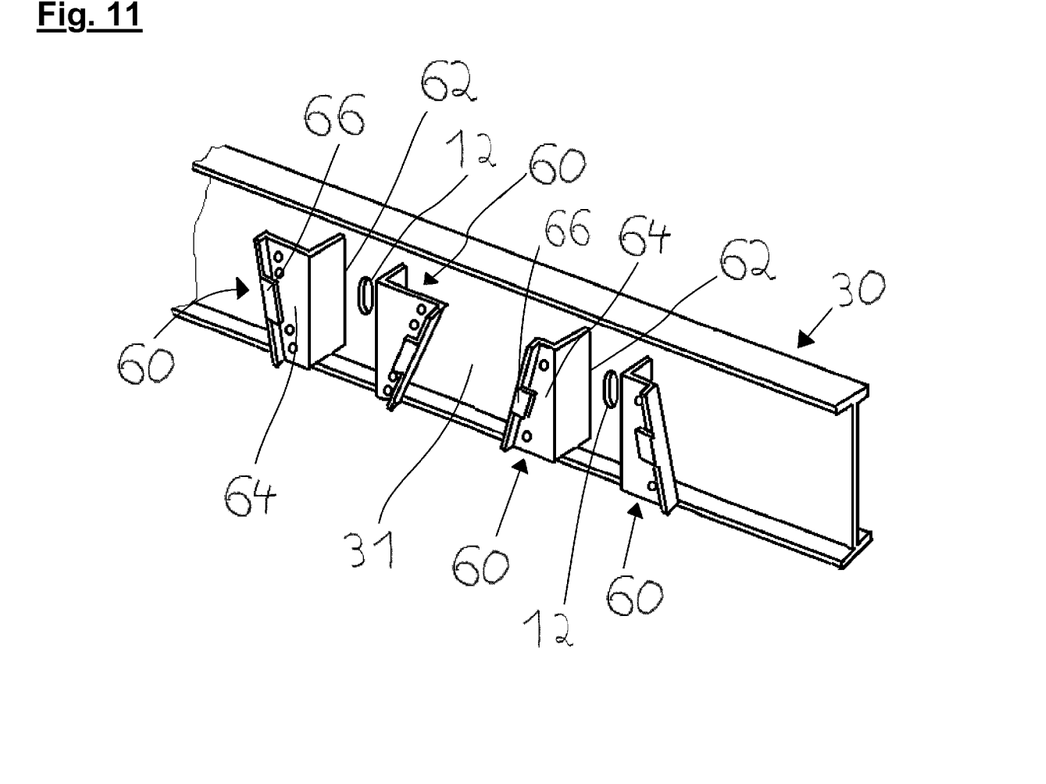
FIG. 11 is a partial elevational side view of various kinds of mounting brackets according to the invention.

FIG. 11 shows different embodiments of mounting brackets 60. In general, all of these embodiments comprise a respective fixing area 62, an angled or half V-shaped mounting area 64, and an undercut section 66. Therefore, each time two mounting brackets 60 are used for the fixing of a mounting device 1 (not shown) in the depicted embodiments. With this configuration, a centering effect can be accomplished. The mounting brackets 60 shown are each welded firmly to the fixing areas 62 on a fixing surface 31 of the further element 30.

LIST OF REFERENCE SYMBOLS

1—Mounting device
2—Supporting area
4—First fixing area
6—First hole series
8—Second fixing area
10—Second hole series
12—Hole (in first fixing area)
14—Hole (in second fixing area)
16—Opening
20—Bracing area
21—Bearing surface
22—Distally bordering surface of the first fixing area
24—Distally bordering surface of the second fixing area
30—Further element
31—Fixing surface
50—Support unit
51—Support tube
52—Lower part of support unit
60—Mounting bracket
62—Fixing area
64—Mounting area
66—Undercut section
D—Diameter
L—Longitudinal direction
L1—Spacing in the longitudinal direction between the holes of the first hole series
L2—Spacing in the longitudinal direction between the holes of the second hole series
M—Mean spacing
N—Normal of the distally bordering surface
Q—Transverse direction
W—Wall thickness
W1—First angle
W2—Second angle
W3—Third angle
X—Supporting direction
X1—Spacing in the supporting direction between the holes of the first hole series
X2—Spacing in the supporting direction between the holes of the second hole series

The invention claimed is:
1. A mounting device for a support unit for commercial vehicles, comprising:
at least one supporting area;
a first fixing area; and
a second fixing area;
wherein the at least one supporting area is configured to absorb supporting forces in a supporting direction from a support unit and/or a support tube;
wherein the first fixing area and the second fixing area are configured to fix the mounting device to a semi-trailer;

wherein the first fixing area has at least one hole, the second fixing area has at least one hole, and the at least one hole of the first fixing area and the at least one hole of the second fixing area are configured to receive a fastener;

wherein the at least one hole of the first fixing area includes a plurality of holes that cooperate to define a first hole series, and wherein the at least one hole of the second fixing area includes a plurality of holes that cooperate to define a second hole series; and wherein the first hole series is slanted with respect to vertical, and/or the second hole series is slanted with respect to vertical.

2. The mounting device as claimed in claim 1, wherein the spacing between certain holes of the plurality of holes of the first hole series and/or the spacing between certain holes of the plurality of holes of the second hole series is not equidistant.

3. The mounting device as claimed in claim 1, wherein at least two holes of the first hole series have different geometries, and/or wherein at least two holes of the second hole series have different geometries.

4. The mounting device as claimed in claim 3, wherein the at least two holes of the first hole series have different diameters, and/or wherein the at least two holes of the second hole series have different diameters.

5. The mounting device as claimed in claim 1, wherein a ratio of a diameter of the at least one hole of the first fixing area and/or the diameter of the at least one hole of the second fixing area to a wall thickness of the first and second fixing areas, respectively, is within a range of 2.33 to 4.75.

6. A mounting device for a support unit for commercial vehicles, comprising:
    at least one supporting area;
    a first fixing area; and
    a second fixing area;
    wherein the at least one supporting area is configured to absorb supporting forces in a supporting direction from a support unit and/or a support tube;
    wherein the first fixing area and the second fixing area are configured to fix the mounting device to a semi-trailer;
    wherein the first fixing area has at least one hole, the second fixing area has at least one hole, and the at least one hole of the first fixing area and the at least one hold of the second fixing area are configured to receive a fastener;
    wherein the at least one hold of the first fixing area includes a plurality of holes that cooperate to define a first hole series, and wherein the at least one hole of the second fixing area includes a plurality of holes that cooperate to define a second hole series; and
    wherein the first hole series forms a first angle with the second hole series lying in the range of 87° to 5°.

7. The mounting device of claim 6, wherein the first angle is within the range of 45° to 10°.

8. The mounting device of claim 7, wherein the first angle is within the range of 26° to 19°.

9. The mounting device as claimed in claim 1, wherein a ratio of a spacing in the supporting direction between adjacent holes of the plurality of holes of the first hole series and/or a spacing in the supporting direction between adjacent holes of the plurality of holes of the second hole series to the wall thickness of the first and second fixing areas, respectively, is in a range of 7.5 to 17.5.

10. The mounting device of claim 9, wherein the ratio is within a range of 8.3 to 16.3.

11. The mounting device of claim 10, wherein the ratio is within a range of 10 to 15.

12. The mounting device as claimed in claim 1, wherein a ratio of a spacing in a longitudinal direction between adjacent holes of the plurality of holes of the first hole series and/or the spacing in a longitudinal direction between adjacent holes of the plurality of holes of the second hole series to the wall thickness of the first and second fixing areas, respectively, is in a range of 0.5 to 5.

13. The mounting device as claimed in claim 12, wherein the ratio is within a range of 0.8 to 3.8.

14. The mounting device as claimed in claim 13, wherein the ratio is within a range of 1.1 to 2.

15. The mounting device as claimed in claim 1, wherein a ratio of a mean spacing between the first hole series and the second hole series to an averaged wall thickness of the first and second fixing areas is in a range of 29 to 62.5.

16. The mounting device of claim 15, wherein the ratio is within a range of 30 to 51.

17. The mounting device of claim 16, wherein the ratio is within a range of 31.5 to 48.

18. A mounting device for a support unit for commercial vehicles, comprising:
    at least one supporting area;
    a first fixing area; and
    a second fixing area;
    wherein the at least one supporting area is configured to absorb supporting forces in a supporting direction from a support unit and/or a support tube;
    wherein the first fixing area and the second fixing area are configured to fix the mounting device to a semi-trailer;
    wherein the first fixing area has at least one hole, the second fixing area has at least one hole, and the at least one hole of the first fixing area and the at least one hole of the second fixing area are configured to receive a fastener; and
    wherein a normal of a distally bordering surface of the first fixing area in the longitudinal direction makes a second angle of 55° to 87° with the supporting direction and/or wherein a normal of a second distally bordering surface of the second fixing area in the longitudinal direction makes a third angle of 55° to 87° with the supporting direction.

19. The mounting device as claimed in claim 1, further comprising:
    a bracing area which extends in a transverse direction or a hole direction away from at least one of the fixing areas or the supporting area; and
    a bearing surface configured to transmit a force by form fit from the mounting device to the semi-trailer in the supporting direction.

20. A mounting bracket, comprising:
    a fixing area; and
    a mounting area;
    wherein the mounting area is configured to make contact with a mounting device as claimed in claim 1; and
    wherein the fixing area is configured to mount on a fixing surface of a semi-trailer.

* * * * *

UNITED STATES PATENT AND TRADEMARK OFFICE
CERTIFICATE OF CORRECTION

| | |
|---|---|
| PATENT NO. | : 11,597,357 B2 |
| APPLICATION NO. | : 16/650443 |
| DATED | : March 7, 2023 |
| INVENTOR(S) | : Stefan Wallmeier and Elmar Weber |

It is certified that error appears in the above-identified patent and that said Letters Patent is hereby corrected as shown below:

On the Title Page

Item (72), Inventors, Line 2:
"Elmar Weber" should read – Dr. Elmar Weber –

In the Claims

Column 11, Claim 6, Lines 45, 48:
"hold" should read – hole –

Signed and Sealed this
Eighth Day of August, 2023

Katherine Kelly Vidal
*Director of the United States Patent and Trademark Office*